(12) United States Patent
Haino et al.

(10) Patent No.: US 6,874,890 B2
(45) Date of Patent: Apr. 5, 2005

(54) PROJECTION DEVICE HAVING FIRST AND SECOND GREEN-LIGHT MODULATION MEANS

(75) Inventors: Yasuyuki Haino, Kanagawa (JP); Ryou Nishima, Kanagawa (JP); Katsuyuki Shudo, Kanagawa (JP); Masaru Kanazawa, Tokyo (JP); Koichi Hamada, Tokyo (JP); Fumio Okano, Tokyo (JP)

(73) Assignee: Nippon Hoso Kyokai, Tokyo (JP)

( * ) Notice: Subject to any disclaimer, the term of this patent is extended or adjusted under 35 U.S.C. 154(b) by 0 days.

(21) Appl. No.: 10/429,956

(22) Filed: May 6, 2003

(65) Prior Publication Data

US 2004/0012761 A1 Jan. 22, 2004

(30) Foreign Application Priority Data

May 7, 2002 (JP) ........................................ 2002-131898

(51) Int. Cl.[7] ........................ G03B 21/00; G03B 21/26; G03B 21/14; G03B 21/28; H04N 9/69

(52) U.S. Cl. ............................. 353/31; 353/34; 353/82; 353/84; 353/94; 353/99; 348/757

(58) Field of Search ............................. 353/31, 34, 37, 353/81, 82, 84, 94, 99, 122; 348/750, 751, 756, 757, 742, 761; 359/634, 629, 638, 639, 587, 589, 490

(56) References Cited

U.S. PATENT DOCUMENTS

| | | | |
|---|---|---|---|
| 5,726,709 A | * | 3/1998 | Kinoshita et al. ............ 348/264 |
| 5,864,374 A | * | 1/1999 | Ito et al. ...................... 348/757 |
| 2003/0214635 A1 | * | 11/2003 | Asakura et al. ................ 353/31 |

* cited by examiner

*Primary Examiner*—David Gray
*Assistant Examiner*—Melissa J Koval
(74) *Attorney, Agent, or Firm*—Armstrong, Kratz, Quintos, Hanson & Brooks, LLP

(57) ABSTRACT

A projecting a plurality of red pixels, green pixels, and blue pixels to display a color image on a screen. First and second green pixels differing in their positions correspond to red and blue pixels projected on the screen.

6 Claims, 6 Drawing Sheets

FIG.9A
PRIOR ART
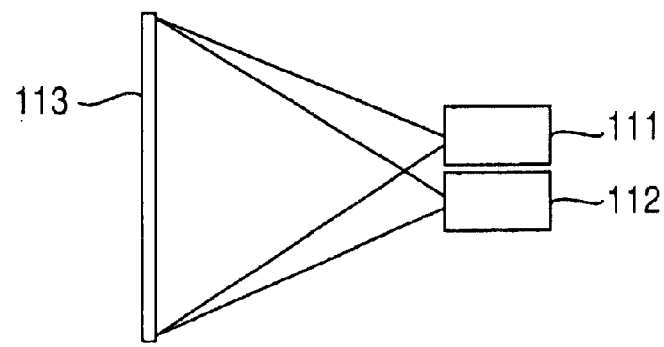
FIG.9B
PRIOR ART
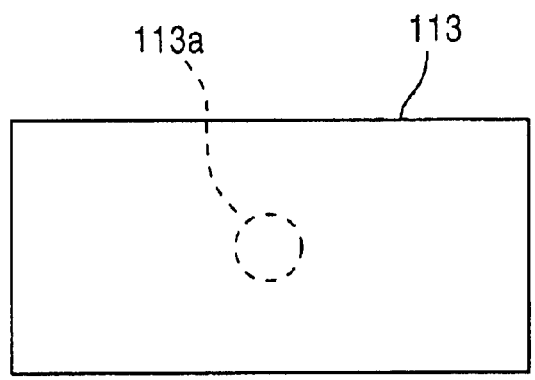
FIG.9C
○ △ ○ △ ○ △ ○ △
★ ✽ ★ ✽ ★ ✽ ★ ✽
○ △ ○ △ ○ △ ○ △
★ ✽ ★ ✽ ★ ✽ ★ ✽
○ △ ○ △ ○ △ ○ △
★ ✽ ★ ✽ ★ ✽ ★ ✽
○ △ ○ △ ○ △ ○ △
★ ✽ ★ ✽ ★ ✽ ★ ✽

PROJECTION DEVICE HAVING FIRST AND SECOND GREEN-LIGHT MODULATION MEANS

BACKGROUND OF THE INVENTION

1. Field of the Invention

The present invention relates to a projection system which projects a color image on a screen utilizing projector devices.

2. Description of the Related Art

Conventionally, in order to display a highly precise image on a large screen, a projection system has been proposed, in which a plurality of projector devices are used to project a color image on a screen.

FIG. 8 shows a conventional projection system in which the same projector devices are arranged.

As shown in FIG. 8A, this projection system is configured so that four (2×2: first to fourth) projector devices including a first projector device 101 and a second projector device 102 are arranged. In a screen 103, images projected from the first and second projector devices 101 and 102 are displayed on neighboring first and second areas $103_1$ and $103_2$.

In the screen 103 shown in FIG. 8B, first to fourth areas $103_1$ and $103_4$ are shown, on which images are displayed through the first to fourth projector devices. The first to fourth projector devices is assigned to display the areas $103_1$ and $103_4$, each of areas $103_1$ and $103_4$ being a quarter of the screen 103.

FIG. 9 shows a projection system, which projects images from the same projector devices on the same area.

As shown in FIG. 9A, four (2×2: first to fourth) projector devices including a first projector device 111 and a second projector device 112 display images on the same area of a screen 113. On the screen 113, pixels projected from respective projector devices are arranged so that these pixels are shifted 0.5 pixels as for the minimum pixel unit with each other. Consequently, as a result, the image displayed on the screen is assumed to be equal in the case where the pixel size becomes half, which leads to a highly precise image.

When a part of an area 113a on the screen 113 shown in FIG. 9B is enlarged, as shown in FIG. 9C, the pixels from the first to fourth projector devices are shifted 0.5 pixels with each other. Specifically, the first pixel from the first projector device 111 depicted as the symbol "circle", the second pixel from the second projector device 112 depicted as the symbol "star", the third pixel from the third projector device (not shown) depicted as the symbol "triangle", and the fourth pixel from the fourth projector device (not shown) depicted as the symbol "asterisk" are arranged so that the positions are shifted 0.5 pixels with each other in the horizontal direction and/or the vertical direction.

In the projection system where the projector devices are arranged as shown in FIG. 8A, precise matching is required at the joint (depicted as broken line a in FIG. 8B) between the images assigned to the respective projector devices. Also, when the number of the pixels is doubled, the number of the projector devices should be increased by a factor of four, leading to a large-scale system.

In the projection system shown in FIG. 9A where images are projected from a plurality of the projector devices on the same area, it is difficult to perfectly shift the images 0.5 pixel over the entire area of the display because of the influence of the deformation of the lens between the projector devices.

An object of the present invention is to provide a projection system, which is composed of a small number of constituents and which can display a highly precise image.

SUMMARY OF THE INVENTION

The projection system of the present invention projects a plurality of red pixels, green pixels, and blue pixels so as to display a color image on a screen by projecting. In the projection system of the present invention, first and second green pixels differing in their positions correspond to red and blue pixels projected on the screen.

Preferably, the positions of the first and second green pixels are shifted 0.5 pixels of the minimum pixel unit in the horizontal direction and/or the vertical direction. For example, if they are shifted 0.5 pixels in both the horizontal and vertical directions, it is recognized that the resolutions in both the horizontal and vertical directions are doubled, respectively.

Because the visibility in humans is the best in the green region, when green pixels are shifted 0.5 pixels to place the pixels in a doubled manner, substantially high resolution can be recognized. This can display a high resolution and highly detailed image by the constitution substantially resembling that of the conventional projector devices. By enlarging the image, a highly detailed image can be realized on a large screen.

The projection system according to the present invention possesses red light-modulation means, which modulates a red pixel, blue light-modulation means which modulates a blue pixel, first green light-modulation means, which modulates first green lights, and second green light-modulation means, which modulates a second green pixel, and the projection system projecting the red pixels, blue pixels, and first and second green pixels.

According to one preferred embodiment, the projection system possesses a first projector device having the red light-modulation means and the blue light-modulation means, and a second projector device having the first green light-modulation means and the second green light-modulation means.

According to another preferred embodiment, the projection system according to the present invention possesses red light and blue light-modulation means, which simultaneously modulates red and blue pixels, instead of the separate red light-modulation means and the blue light-modulation means, and red light and blue light-modulation means includes filters for red lights and blue lights corresponding to the red pixel and the blue pixel.

BRIEF DESCRIPTION OF THE DRAWINGS

FIGS. 9A, 9B and 9C show a projection system, which projects images from the same projector devices on the same area.

DETAILED DESCRIPTION OF THE PREFERRED EMBODIMENTS

Embodiments of the projection systems according to the present invention will be described, referring to the attached drawings.

Figure 1:
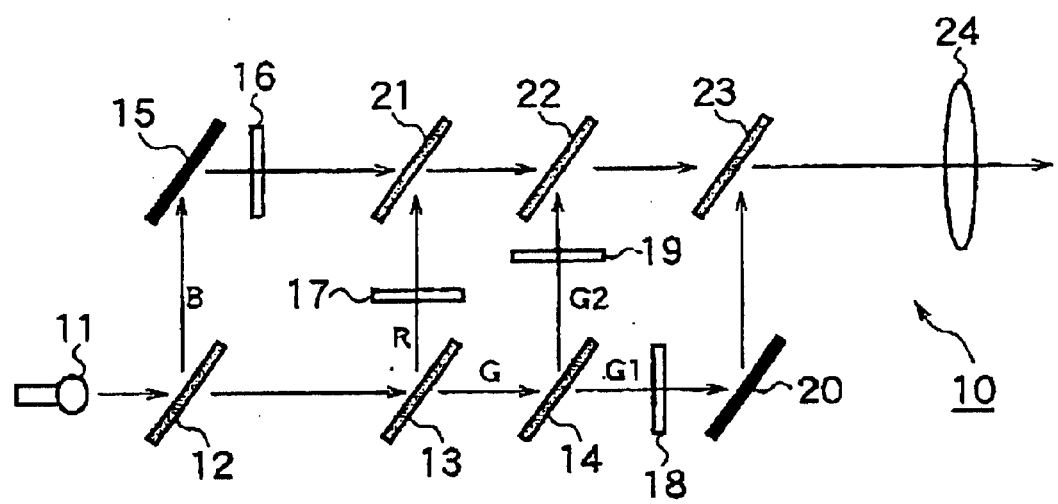
FIG. 1 shows a projector device according to the first embodiment of the present invention.

FIG. 1 shows a projector device 10 according to the first embodiment of the present invention.

The projector device 10 possesses four sheets of liquid crystal panels. Specifically, the projector device 10 possesses one liquid crystal panel 17 for red light, which modulates red lights (red light-modulation means), and one liquid crystal panel 16 for blue light, which modulates blue lights (blue light-modulation means). Also, the projector device 10 possesses a liquid crystal panel 18 for first green light, which modulates first green lights (first green light-modulation means), and a liquid crystal panel 19 for second green light, which modulates second green lights (second green light-modulation means).

The liquid crystal panel 17 for red light, the liquid crystal panel 16 for blue light, and the liquid crystal panels 18 and 19 for first and second green lights have the same resolution. The first and second green pixels projected on a screen through the first and second green lights are shifted 0.5 pixels with each other. These liquid crystal panels 16, 17, 18, and 19, which are used, are light transmission type liquid crystal elements. In the embodiments described later on, light transmission liquid crystal elements are used in the type liquid crystal panels.

The projector device 10 has a lamp 11 for emitting a white light, a first dichroic mirror 12 in which the white light emitted from the lamp 11 enters, a second dichroic mirror 13, in which the light transmitted through the first dichroic mirror 12 enters, a half mirror 14, in which a green light (G) transmitted through the second dichroic mirror 13 enters, and a first mirror 15 in which a blue light (B) reflected at the first dichroic mirror 12 enters.

Also, the projector device 10 possesses the liquid crystal panel 16 for blue light (blue light-modulation means), in which a blue light reflected at the first mirror 14 enters, the liquid crystal panel 17 for red light (red light-modulation means), in which a red light (R) reflected at the second dichroic mirror 13 enters, the liquid crystal panel 18 for first green light (first green light-modulation means), in which a first green light (G1) transmitted through the first half mirror 14 enters, and liquid crystal panel 19 for second green light (second green light-modulation means), in which a second green light (G2) reflected at the first half mirror 14 enters.

Furthermore, the projector device 10 possesses a second mirror 20, in which a light enters from the liquid crystal panel 18 for first green light, a third dichroic mirror 21, in which lights enter from the liquid crystal panel 16 for blue light and the liquid crystal panel 17 for red light, a fourth dichroic mirror 22, in which the lights enter from the liquid crystal panel 19 for second green light and the third dichroic mirror 21, a second half mirror 23, in which the lights enter from the second mirror 20 and the fourth dichroic mirror 22, and a projection lens 24, in which a light enters from the second half mirror.

The white light emitted from the lamp 11 enters the first dichroic mirror 12, in which a red light and a green light are transmitted and in which a blue light is reflected. The red light and the green light transmitted through the first dichroic mirror 12 enter the second dichroic mirror 13, in which the green light is transmitted and at which the red light is reflected. The green light transmitted through the second dichroic mirror 13 enters the first half mirror 14, in which a half of the green light is transmitted and at which the remaining half of the green light is reflected. The blue light reflected at the first dichroic mirror 12 enters the first mirror 15, which is reflected.

The blue light reflected at the first mirror 15 enters the liquid crystal panel 16 for blue light, which is then modulated. The red light reflected at the second dichroic mirror 13 enters the liquid crystal panel 17 for red light, which is then modulated. The half of the green light transmitted through the first half mirror 14 enters the liquid crystal panel 18 for a first green light, which is then modulated. The remaining half of the green light reflected on the first half mirror 14 enters the liquid crystal panel 19 for second green light, which is then modulated.

The green light having been modulated at the liquid crystal panel 18 for first green light enters the second mirror 20 and is reflected. The blue light having been modulated at the liquid crystal panel 16 for blue light enters the third dichroic mirror 21 and is transmitted. The red light having been modulated at the liquid crystal panel 17 for red light enters the third dichroic mirror 21 and is reflected. The blue light and the red light from the third dichroic mirror 21 enters the fourth dichroic mirror 22 and are transmitted. The second green light having been modulated through the liquid crystal panel 19 for second green light enters the fourth dichroic mirror 22, and is reflected. The first green light reflected at the second mirror 20 enters the second half mirror 23, and part of the green light is reflected. The blue light, red light, and the green light from the fourth dichroic mirror 22 enter the second half mirror 23, and parts of them are transmitted. The light from the half mirror 23 enters the projection lens and then is projected on a screen (not shown).

The blue light, the red light, and the green light are projected on the same region on the screen (not shown) through the projection lens 24 to make up an image. On the screen, the first and second green pixels corresponding to the first and second green lights having been modulated through the first and second liquid crystal panels 18 and 19 for green light are arranged so that they are shifted 0.5 pixels as the minimum pixel unit in the horizontal direction and/or the vertical direction. Because green is the maximum at the human's visible region, when the green pixels are shifted 0.5 pixels so as to arrange the pixels in a doubled manner, substantial high resolution is recognized. This makes it possible to realize a highly detailed image with a high resolution only by the constitution substantially resembling that of the conventional projector devices. By enlarging the image, a highly detailed image can also be realized on a large screen.

In the following embodiments, the first and second green pixels are shifted 0.5 pixels similar to the foregoing embodiment. Specific arrangements of the first and second green pixels will be described later on by referring to FIG. 6.

Figure 2:
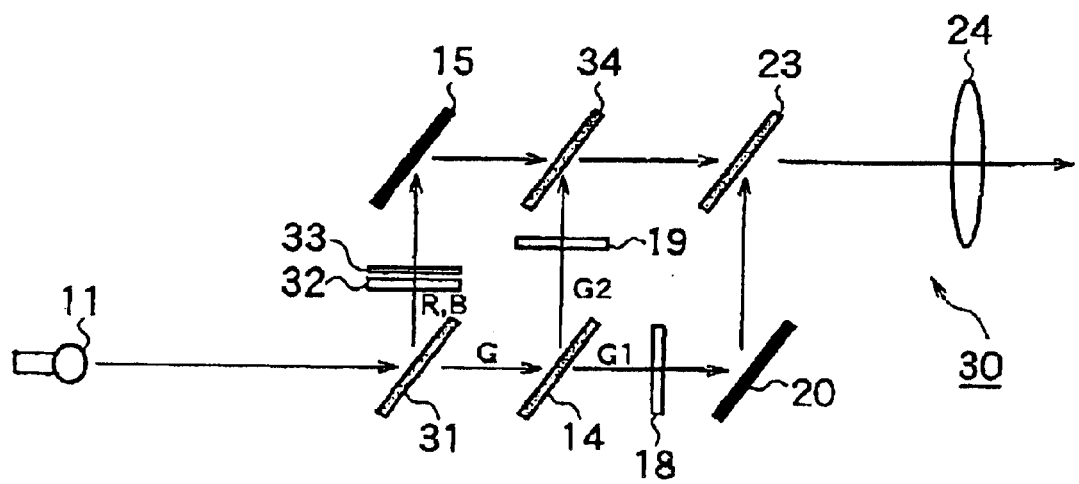
FIG. 2 shows a projector device according to the second embodiment of the present invention.

FIG. 2 shows a projector device 30 according to the second embodiment of the present invention.

In the projector device 30 in the second embodiment, parts corresponding to those of the projector device 10 are referred to the same symbols or numbers.

The projector 30 possesses three liquid crystal panels, i.e., a liquid crystal panel 32 for red and blue lights, which simultaneously modulates red and blue lights (red light and blue light-modulation means), a liquid crystal panel 18 for first green light, which modulates first green lights (first green light-modulation means), and a liquid crystal panel 19 for second green light, which modulates second green lights (second green light-modulation means).

The liquid crystal panel 32 for red and blue lights, and the liquid crystal panels 18 and 19 for first and second green lights have the same resolution. The first and second green pixels projected on a screen through the first and second green lights are shifted 0.5 pixels with each other. The red light and blue light-modulation means may be configured to include a filter 33 for red and blue lights.

The projector device 30 has a lamp 11 for emitting a white light, a first dichroic mirror 31 in which the white light emitted from the lamp 11 enters, and a first half mirror 14.

Also, the projector device 30 possesses the liquid crystal panel 32 for red and blue lights (red light and blue light-modulation means), in which a red light (R) and blue light (B) reflected at the first dichroic mirror 31 enter, a filter 33 for red and blue lights (red light and blue light-modulation means), in which the red light and the blue light having been modulated through the liquid crystal panel 32 for red and blue lights enters, the liquid crystal panel 18 for first green light (first green light-modulation means), in which a first green light (G1) transmitted through the first half mirror 14 enters, and liquid crystal panel 19 for second green light (second green light-modulation means), in which a second green light (G2) reflected at the first half mirror 14 enters.

Furthermore, the projector device 30 possesses a first mirror 15, in which the light enters from the filter 33 for red light and blue light enter, a second mirror 20, in which the first green light enters from the liquid crystal panel 18 for first green light, a second dichroic mirror 34, in which lights enter from the second mirror 15 and the liquid crystal panel 19 for second green light, a second half mirror 23 in which lights enter from the second mirror 20 and the second dichroic mirror 34, and a projection lens 24 in which a light enters from the second half mirror 23.

The white light emitted from the lamp 11 enters the first dichroic mirror 31, in which a green light is transmitted and at which a red light and a blue light are reflected. The green light transmitted through the first dichroic mirror 31 enters the first half mirror, in which half of the green light is transmitted and at which the remaining half of the green light is reflected.

The red light and blue light reflected at the first dichroic mirror 31 are modulated through the liquid crystal panel 32 for red and blue lights, and filtered through the filter 33 for red light and blue light. The half of the green light transmitted through the first half mirror 14 is modulated through the liquid crystal panel 18 for first green light. The remaining half of the green light reflected on the first half mirror 14 is modulated through the liquid crystal panel 19 for the second green light.

The red light and the blue light filtered through the filter 33 for red light and blue light enter the first mirror 15 and reflected. The green light having been modulated through the liquid crystal panel 18 for first green light enters the second mirror 20 and is reflected.

The red light and the blue light reflected at the first mirror 15 enter the second dichroic mirror 34, and are transmitted. The second green light having been modulated at the liquid crystal panel 19 for the second green light enters the second dichroic mirror 34 and is reflected. The first green light reflected at the second mirror 20 enters the second half mirror 23, and a part of the green light is reflected. The light from the second dichroic mirror 34 enters the second half mirror 23, and a part of the light is transmitted. The light from the second half mirror 23 enters the projection lens 24, and is projected on a screen (not shown).

Similar to the first embodiment described previously, the first and second green pixels corresponding to the first and second green lights having been modulated through the first and second liquid crystal panels 18 and 19 for green light are positioned on the screen where they are shifted 0.5 pixels of the minimum pixel unit in the horizontal direction and/or the vertical direction. This makes it possible to realize a highly detailed image with high resolution. The constitution of the second embodiment is much smaller than that of the first embodiment.

Figure 3:
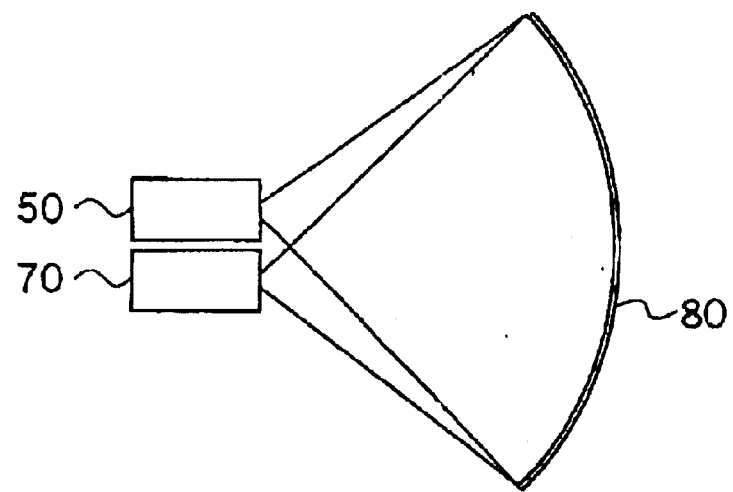
FIG. 3 shows a projector device according to the third embodiment of the present invention.

FIG. 3 shows a third embodiment where lights are projected on a screen through a first projector device 50 and a second projector device 70.

A first projector device 50 projects a red (R) light, and a blue light (B) on a screen. A second projector 70 projects a green light (G) on the screen 80. The images projected from the first and second projector devices 50 and 70 are projected on the same position on the screen 80.

Figure 4:
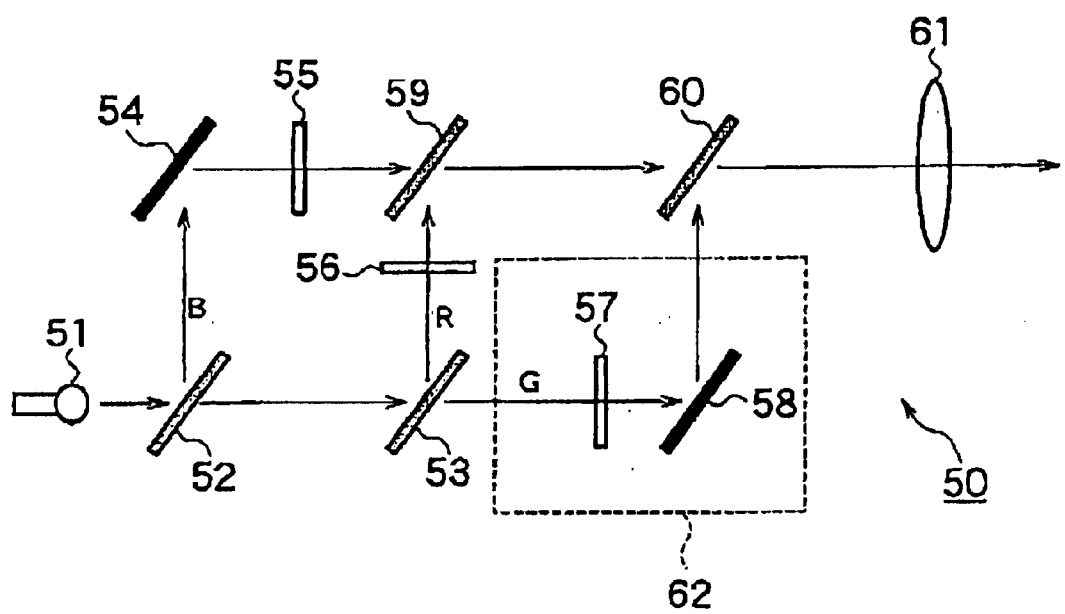
FIG. 4 shows a first projector device according to the third embodiment of the present invention.

FIG. 4 shows a first projector device 50 according to the third embodiment of the present invention.

The first projector device 50 possesses two liquid crystal panels, i.e., a liquid crystal panel 56 for red light (red light-modulation means), and a liquid crystal panel 55 for blue light (blue light-modulation means).

In the projector device 50, a part 62 for modulating a green light (G) does not actuate or the projector device 50 may have no part 62 for modulating a green light (G). In this embodiment, first, the configuration where the part 62 for modulating a green light (G) is provided will be described.

The first projector device 50 has a lamp 51 for emitting a white light, a first dichroic mirror 52 in which the white light emitted from the lamp 51 enters, a second dichroic mirror 53, in which the light from the first dichroic mirror 52 enters, and a first mirror 54 in which a blue light (B) reflected at the first dichroic mirror 52 enters.

Also, the first projector device 50 possesses the liquid crystal panel 55 for blue light (blue light-modulation means), in which a blue light reflected at the first mirror 54 enters, the liquid crystal panel 56 for red light (red light-modulation means), in which a red light (R) reflected at the second dichroic mirror 53 enters, and the liquid crystal panel 57 for green light, in which a green light transmitted through the second dichroic mirror 53 enters.

Furthermore, the first projector device 50 possesses a third dichroic mirror 59, in which lights enter from the liquid crystal panel 55 for blue light and the liquid crystal panel 56 for red light, and a half mirror 60 in which the lights enter from the first mirror 58 and the third dichroic mirror 59.

The white light emitted from the lamp 51 enters the first dichroic mirror 52, in which a red light and a green light are transmitted and at which a blue light is reflected. The red light and the green light transmitted through the first dichroic mirror 52 enter the second dichroic mirror 53, in which the green light is transmitted and at which the red light is reflected. The blue light reflected at the first dichroic mirror 52 enters the first mirror 54 and is reflected.

The blue light reflected at the first mirror 54 enters the liquid crystal panel 55 for blue light, which is then modulated. The red light reflected at the second dichroic mirror 53 enters the liquid crystal panel 56 for red light, which is then modulated. The green light transmitted through the second dichroic mirror 53 enters the liquid crystal panel 57 for green light, which is then modulated.

The light having been modulated at the liquid crystal panel 55 for blue light enters the second dichroic mirror 59 and is transmitted. The light having been modulated at the liquid crystal panel 56 for red light enters the second dichroic mirror 59 and is reflected. The blue light and the red light from the second dichroic mirror 59 enter the half mirror 60, and parts of them are transmitted. The green light reflected at the second mirror enters the half mirror 60, and a part of the light is reflected. The light from the half mirror 60 enters the projection lens 61 and is projected on a screen 80.

Because the first projector device 50 only projects a red light and a blue light, the part 62 for modulating a green light is not actuated or is not provided. For example, the liquid crystal panel 57 for green light always inhibits th e green light from t he second dichroic mirror 53 to be transmitted. Otherwise, the part 62 for modulating a green light is taken out of the first projector device 50.

Figure 5:
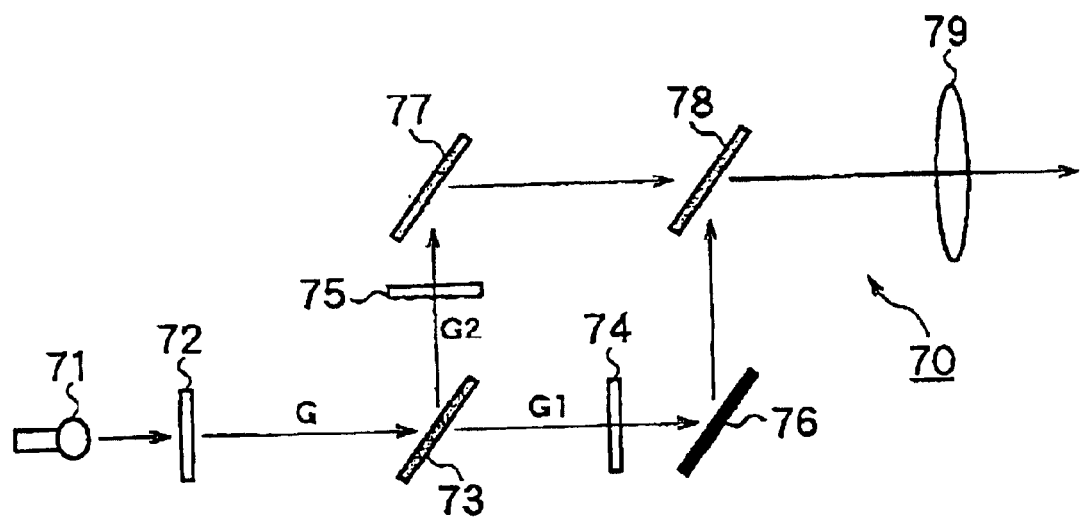
FIG. 5 shows a second projector device according to the third embodiment of the present invention.

FIG. 5 shows a second projector device 70 according to the third embodiment of the present invention.

The second projector device 70 possesses two series of the first green light-modulation means, i.e., a liquid crystal panel 74 for first green light (first green light-modulation means), which modulates a first green light (G1), and a liquid crystal panel 75 for second green light (second green light-modulation means), which modulates a second green light (G2). These liquid crystal panels 74 and 75 for green lights have the same resolution as that of the liquid crystal panel 56 for red light and that of the liquid crystal panel 55 for blue light.

The second projector device 70 has a lamp 71 for emitting a white light, a filter 72 for green light in which the white light emitted from the lamp 71 enters, a half mirror 72, in which a green light (G) transmitted through the filter for green light enters, a liquid crystal panel 74 for first green light in which a first green light transmitted through the half mirror 73 enters, and a liquid crystal panel 75 for second green light in which a second green light reflected at the half mirror 73 enters.

Also, the second projector device 70 possesses a first mirror 76, in which the first green light from the liquid crystal panel 74 for first green light enters, a second mirror 77, in which the second green light from the liquid crystal panel 75 for second green light enters, a second half mirror 78, in which green light enters from the first mirror 76 and the second mirror 77, and a projection lens 79, in which the green light enters from the second half mirror 78.

The white light emitted from the lamp 71 enters the filter 72 for green light, through which only the green light is transmitted. The green light transmitted through the filter 72 for green light enters the first half mirror 73, in which half of the green light is transmitted and at which the remaining half of the green light is reflected. The first green light transmitted through the first half mirror 73 enters the liquid crystal panel 74 for first green light and is modulated. The second green light reflected at the first half mirror 73 enters the liquid crystal panel 75 for second green light and is modulated.

The first green light having been modulated through the liquid crystal panel 74 for first green light enters the first mirror 76 and is reflected. The second green light having been modulated through the liquid crystal panel 75 for second green light enters the second mirror 77 and is reflected. The first green light reflected at the first mirror 76 enters the second half mirror 78, and a part of the light is reflected. The second green light reflected at the second mirror 77 enters the second half mirror 78, and a part of the light is transmitted. The light from the half mirror 78 enters the projection lens 71, and is projected on the screen 80.

Figure 6:
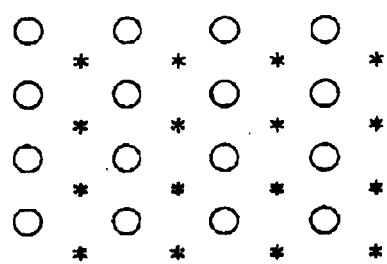
FIG. 6 shows the arrangement of a first green pixel and a second green pixel projected from the second projector device.

FIG. 6 shows the arrangement of pixels projected through the second projector device 70. In this figure, the symbol "circle" represents the first green light (G1) modulated through the liquid crystal panel 74 for first green light, and the symbol "asterisk" represents the second green light (G2) modulated through the liquid crystal panel 75 for second green light. The centers of the first and second pixels are overlapped at the position where they are shifted 0.5 pixels, i.e., ½ of the minimum pixel unit pitch, in the horizontal direction and the vertical direction.

As described previously, because the visibility in humans is at maximum for the green light, when the arrangement of the pixels is doubled by shifting the green pixels 0.5 pixels, it is sensed by the humans' eyes that the resolutions both in the horizontal direction and the vertical direction are doubled. Consequently, a substantial high resolution is recognized and an image on a large display can be realized.

The positional relationship between the pixels from the first and the second green lights can be maintained as it is, if it is adjusted at the time of assembling the second projector device 70. Because the first projector device 50, which projects red and blue lights and the second projector device 70, which projects the first and second green lights have a construction different from each other, they should be aligned. A technique for convergence adjustment, which has conventionally been performed in a CRT, is available for this alignment, and, thus, the alignment can easily be performed.

In this third embodiment, the conventional projector device is applied to the first projector device 50, which projects a red light and a blue light, and the second projector device 70, which project green lights, is separately provided. Consequently, only the second projector device may be added to the conventional projector device, the projection system according to the present invention can be constructed, meaning that high resolution can be realized only with small constitution.

Figure 7:
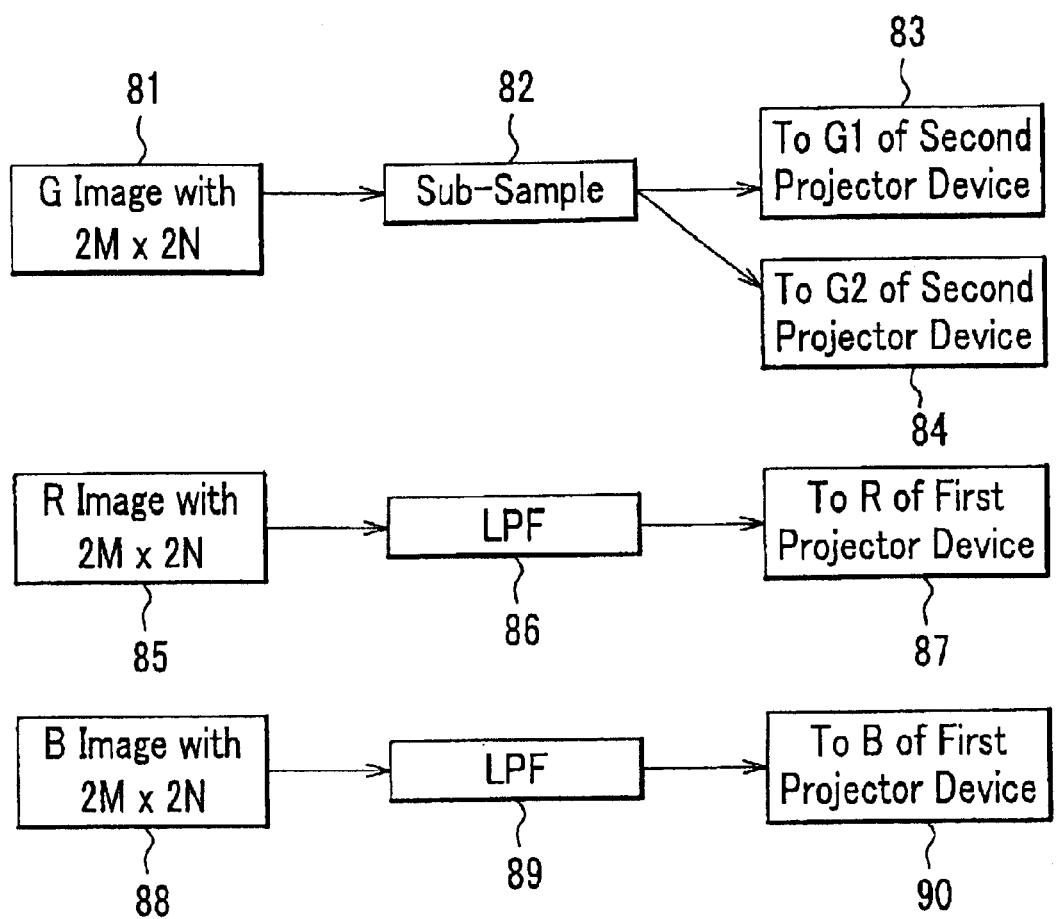
FIG. 7 shows a processing of the image signals in the projector device according to the third embodiment.
Figure 8A:
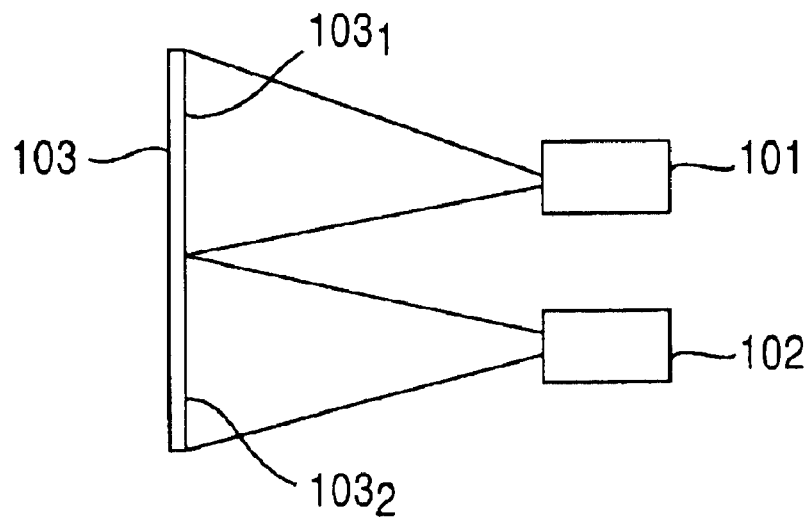
FIGS. 8A and 8B show a conventional projection system in which the same projector devices are arranged.
Figure 8B:
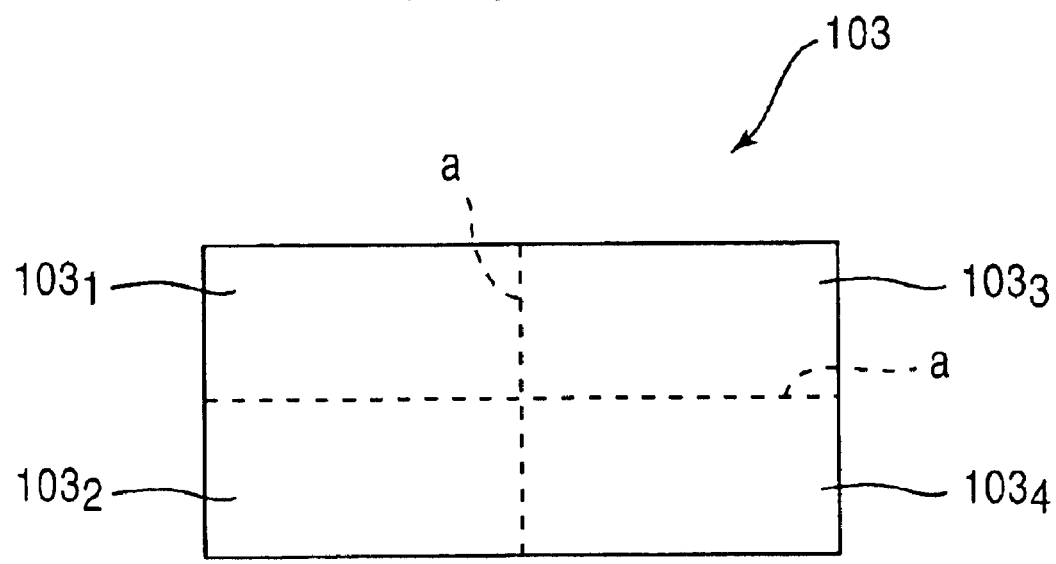

FIG. 7 shows a processing of the image signals in the projector device according to the third embodiment.

When a number of pixels of each liquid crystal panel are M in length and N in width (M×N), as for green light, an image comprising 2M in length and 2N in width (2M×2N) can be displayed in high detail by projecting green light which has been shifted by half pixel pitch.

A green (G) image (8I) having a number of pixels of 2M×2N is subjected to a sampling processing 70 where pixels corresponding to the first green light (G1) and the second green light in FIG. 6 are extracted to form a signal 83 for the first green light and a signal 84 for the second green light in the second projector device 70.

A red (R) image having a number of pixels of 2M×2N is subjected to processing where an M×N image is taken by a low pass filter (LPF) 86 to form a signal (87) for pixel of the red light in the first projector device 50.

A blue (B) image having a number of pixels of 2M×2N is subjected to processing where an M×N image is taken by a low pass filter (LPF) 89 to form a signal (90) for pixel of the blue light in the first projector device 50.

By performing such signal processing constructed as described above, flicker inherent to the liquid crystal projection system can be moderated. Specifically, because the flicker occurs due to the characteristic difference between a positive signal and a negative signal applied to the liquid crystal panel, they can be contradicted by making quantities of light from both polar liquid crystal panels equal. In this embodiment, it can be performed by selecting appropriate signals in sub-sampling and low pass filters.

As described above, according to the present invention, a highly precise image can easily be constructed. Specifically, as compared with the conventional projection system where a plurality of the projectors are arranged, the image obtainable from the present invention is seamless, the projection system of the present invention is not required to make an adjustment of the seam. In such a conventional projection system, in order to double the resolution, 2×2, i.e., four, projector devices is required, whereas the projection system according to the present invention, only two projectors are required for doubling the horizontal and vertical resolutions.

In comparison with the conventional projection system where images are projected through a plurality of the projectors on the same region, because the same projection lens is used for the green light in the present invention, the positional relation is not shifted due to the deformation of the lens and, thus, the high detail image can be maintained over the entire area of the display in the projection system of the present invention.

While the embodiments of the present invention have been described, it should be noted that the present invention is not restricted to these embodiments. For example, a transmission liquid crystal element has been used as the modulation means in these embodiments, the present invention is not restricted thereto. A DMD (digital mirror device) and reflective type liquid crystal elements may be used as the modulation means.

What is claimed is:

1. A projection system which projects a plurality of red pixels, green pixels, and blue pixels to display a color image on a screen, comprising
   red-light modulation means, which modulates a red pixel,
   blue-light modulation means, which modulates a blue pixel,
   first green-light modulation means, which modulates a first green pixel,
   second green-light modulation means, which modulates a second green pixel,
   a first projector device having the red-light modulation means and the blue-light modulation means;
   a second projector device having the first green-light modulation means and the second green-light modulation means,
   wherein the red pixel, the blue pixel, the first green pixel, and the second green pixel are projected on the screen.

2. The projection system according to claim 1, wherein said first pixel and said second pixel are projected on the screen in such a manner that these pixels are shifted 0.5 pixels with each other in the horizontal direction and/or vertical direction.

3. The projection system according to claim 1, wherein said light modulation means comprises a transmission liquid crystal element, DMD, or reflective type liquid crystal element.

4. A projection system which projects a plurality of red pixels, green pixels, and blue pixels color image on a screen, comprising:
   first green-light modulation means which modulates a first green pixel;
   second green-light modulation means which modulates a second green pixel; and
   a red-light modulation means which simultaneously modulates a red pixel and a blue-light pixel, said red-light and blue-light modulation means including a filter for a red pixel and a blue pixel corresponding to the red pixel and the blue pixel.

5. The projection system according to claim 4, wherein said first pixel and said second pixel are projected on the screen in such a manner that these pixels are shifted 0.5 pixels with each other in the horizontal direction and/or vertical direction.

6. The projection system according to claim 4, wherein said light modulation means comprises a transmission liquid crystal element, DMD, or reflective type liquid crystal element.

* * * * *